United States Patent
Panshin et al.

(10) Patent No.: US 9,639,794 B2
(45) Date of Patent: May 2, 2017

(54) SECURE UPGRADE SUPPLIES AND METHODS

(71) Applicant: Hewlett-Packard Development Company, L.P., Houston, TX (US)

(72) Inventors: Stephen D. Panshin, Corvallis, OR (US); Jefferson P. Ward, Brush Prairie, WA (US); David B. Novak, Pilomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/879,656

(22) Filed: Oct. 9, 2015

(65) Prior Publication Data

US 2016/0034802 A1    Feb. 4, 2016

Related U.S. Application Data

(63) Continuation of application No. 13/821,917, filed as application No. PCT/US2010/048143 on Sep. 8, 2010, now abandoned.

(51) Int. Cl.
     *G06K 15/00*         (2006.01)
     *G06F 21/57*         (2013.01)
     (Continued)

(52) U.S. Cl.
     CPC .......... *G06K 15/4095* (2013.01); *G06F 8/65* (2013.01); *G06F 21/44* (2013.01); *G06F 21/572* (2013.01);
     (Continued)

(58) Field of Classification Search
None
See application file for complete search history.

(56) References Cited

U.S. PATENT DOCUMENTS

| 5,995,774 A | 11/1999 | Applegate et al. |
| 6,658,219 B1 * | 12/2003 | Ito .......... G03G 15/553 399/12 |

(Continued)

FOREIGN PATENT DOCUMENTS

| CN | 101251883 | 8/2008 |
| CN | 101714094 | 5/2010 |

OTHER PUBLICATIONS

State Intellectual Property Office of China, "Office Action," issued in connection with Chinese patent application No. 201080069035.0, on Dec. 31, 2014, 7 pages.

(Continued)

*Primary Examiner* — Idowu O Osifade
(74) *Attorney, Agent, or Firm* — Hanley Flight & Zimmerman, LLC (57) ABSTRACT

Example secure upgrade supplies and methods are disclosed. A disclosed example upgrade supply cartridge structured includes a chamber to store a material useable by the imaging forming apparatus to form an image on media; a security device to provide an authentication credential to an image forming apparatus, the authentication credential useable to authenticate an identity of the upgrade supply cartridge; and a tamperproof data storage including upgrade data useable by the image forming apparatus to activate a capability included but disabled in the image forming apparatus, the tamperproof data storage structured to store an identifier of the image forming apparatus after the upgrade supply cartridge has been utilized by the image forming apparatus to activate the disabled capability.

14 Claims, 6 Drawing Sheets

(51) Int. Cl.
*G06F 21/60* (2013.01)
*G06F 21/44* (2013.01)
*G06F 9/445* (2006.01)

(52) U.S. Cl.
CPC .... *G06F 21/608* (2013.01); *G06F 2221/2129* (2013.01); *G06F 2221/2153* (2013.01); *G06K 2215/002* (2013.01)

(56) References Cited

U.S. PATENT DOCUMENTS

| | | | |
|---|---|---|---|
| 7,522,732 | B2 | 4/2009 | Whitehead |
| 2002/0149791 | A1 | 10/2002 | Ozawa et al. |
| 2003/0028766 | A1 | 2/2003 | Gass et al. |
| 2003/0191955 | A1 | 10/2003 | Wagner et al. |
| 2003/0215248 | A1 | 11/2003 | Silence et al. |
| 2005/0283777 | A1 | 12/2005 | Osen |
| 2006/0087678 | A1* | 4/2006 | Simpson ............... G06F 21/34 358/1.15 |
| 2006/0107071 | A1 | 5/2006 | Girish et al. |
| 2006/0143600 | A1 | 6/2006 | Cottrell et al. |
| 2007/0011023 | A1 | 1/2007 | Silverbrook |
| 2007/0028120 | A1 | 2/2007 | Wysocki et al. |
| 2008/0316533 | A1* | 12/2008 | Kawai ............... G03G 15/5075 358/1.16 |
| 2009/0161143 | A1 | 6/2009 | Nakamoto |
| 2009/0271533 | A1 | 10/2009 | Asnaashari |
| 2010/0079793 | A1 | 4/2010 | Nishikawa |

OTHER PUBLICATIONS

STMicroelectronics, "ST23 highly secure smartcard ICs," http://www.st.com/stonline/products/families/smartcard/ sc_st23.htm, retrieved online on Mar. 17, 2010, 2 pages.

Korean Intellectual Property Office, "International Search Report," issued in connection with PCT application PCT/US2010/048143, mailed on May 19, 2011, 3 pages.

Korean Intellectual Property Office, "Written Opinion of the International Searching Authority," issued in connection with PCT application PCT/US2010/048143, mailed on May 19, 2011, 3 pages.

United States Patent and Trademark Office, "Non-Final Office Action", issued in connection with U.S. Appl. No. 13/821,917, on Apr. 24, 2014, 22 pages.

United States Patent and Trademark Office, "Non-Final Office Action", issued in connection with U.S. Appl. No. 13/821,917, on Feb. 13, 2015, 23 pages.

United States Patent and Trademark Office, "Final Office Action", issued in connection with U.S. Appl. No. 13/821,917, on Oct. 23, 2014, 19 pages.

United States Patent and Trademark Office, "Final Office Action", issued in connection with U.S. Appl. No. 13/821,917, on Jun. 18, 2015, 37 pages.

* cited by examiner

SECURE UPGRADE SUPPLIES AND METHODS

RELATED APPLICATIONS

This patent is a continuation of U.S. patent application Ser. No. 13/821,917, entitled "SECURE UPGRADE SUPPLIES AND METHODS," which is a 371 National Stage of PCT Application NO. PCT/US10/48143, entitled "SECURE UPGRADE SUPPLIES AND METHODS." U.S. patent application Ser. No. 13/821,917 and PCT Application NO. PCT/US10/48143 are hereby incorporated by reference in their entireties.

BACKGROUND

Image forming apparatus such as printers are designed and manufactured to support, perform and/or carry out particular functions. Generally, the features, capabilities and functions of a printer are embedded into the printer's firmware during manufacture and remain fixed throughout the printer's functional life.

DETAILED DESCRIPTION

Traditionally the features, capabilities and functions supported by an image formation apparatus (e.g., a printer, an inkjet printer, a dye sublimation printer, a laser printer, a color laser printer, etc.) have been determined, selected and/or fixed during product design. However, the design, manufacture and sale of fixed-functionality image formation apparatus may have a number of disadvantages. For example, because each model has associated design and carrying costs, it may be difficult or costly to customize models for different geographic regions. Further, it may be difficult to pre-identify the features of most interest to high-volume and/or high-value customers. Therefore, the set of features incorporated during product design may not result in an image forming apparatus of interest to these consumers. For these, and/or other reasons, it is desirable to be able to upgrade image formation apparatus functionality late in the product design cycle, during product testing, after product testing, during product release, during market introduction, while a product is being sold, after a product has been sold, after a product has been installed, and/or after a product has been discontinued.

As used herein, image forming apparatus upgrade refers to the activation and/or enablement of a latent, but inactive or inaccessible, feature, functionality and/or capability of an image forming apparatus. Such latent features, functions and/or capabilities are included and/or implemented in the image forming apparatus but not activated, accessible and/or enabled until one of the example upgrade imaging supplies described herein is used to upgrade the image forming apparatus. As described herein, an image forming apparatus may be upgraded without having to modify, change, update and/or upgrade the firmware of the image forming apparatus. Similarly, image forming apparatus downgrade refers to the deactivation and disablement of a feature, functionality and/or capability of an image forming apparatus.

Example methods, apparatus and articles of manufacture to securely upgrade image forming apparatus such as printers are disclosed. In disclosed examples, the image forming apparatus is upgraded using upgrade data stored on and obtained from an upgrade imaging supply (e.g., an ink supply cartridge) when the upgrade imaging supply is inserted into and/or installed in the image forming apparatus. As used herein, the term "upgrade imaging supply" refers to an imaging supply (e.g., an ink supply cartridge) containing information and/or data that may be accessed by an image forming device and used by the image forming device to upgrade the image forming device (e.g., enable and/or activate one or more latent features, functionalities and/or capabilities).

As disclosed herein, secure upgrades may be implemented using an upgrade imaging supply having an embedded integrated circuit (IC) containing tamperproof data storage storing upgrade data. The IC may be implemented via, for example, a smartcard. A disclosed example image forming apparatus includes a second smartcard IC and an associated tamperproof identifier (ID). In some examples, the ID is unique to the image forming apparatus. The image forming apparatus can authenticate the smartcard IC in the upgrade imaging supply and authenticate the smartcard IC in the image forming apparatus to establish a cryptographically secure communication session, and/or to securely transfer data or information between the image forming apparatus and the imaging supply. The secure communication session may be used to securely obtain and verify the upgrade data before it is stored and/or applied to upgrade the image forming apparatus. In some examples, the upgrade data is securely and/or cryptographically stored (e.g., encrypted) in a non-volatile memory of the image forming apparatus to prevent unauthorized copying or counterfeiting of the upgrade data to another image forming apparatus, and/or to enable verification and/or authentication of the upgrade data to prevent and/or detect tampering and/or corruption. Additionally or alternatively, after an image forming apparatus has been upgraded from an upgrade imaging supply, the tamperproof data storage of the upgrade imaging supply may be securely updated with the ID of the image forming apparatus to signify that the upgrade imaging supply has already been used to upgrade that particular image forming apparatus. Thus, the unauthorized upgrade of multiple image forming apparatus from a single upgrade imaging supply can be substantially detected and prevented.

While example methods, apparatus and articles of manufacture to upgrade image forming apparatus are described herein, the example methods, apparatus and articles of manufacture may additionally or alternatively be used to securely upgrade any number and/or type(s) of other device(s) and/or component(s). Other example devices and components that may be securely upgraded (downgraded) include, but are not limited to engine control systems, automobiles, home appliances, consumer electronics, heating and cooling systems, and/or any other devices and/or systems including a processor and embedded firmware and/or software.

Figure 1:
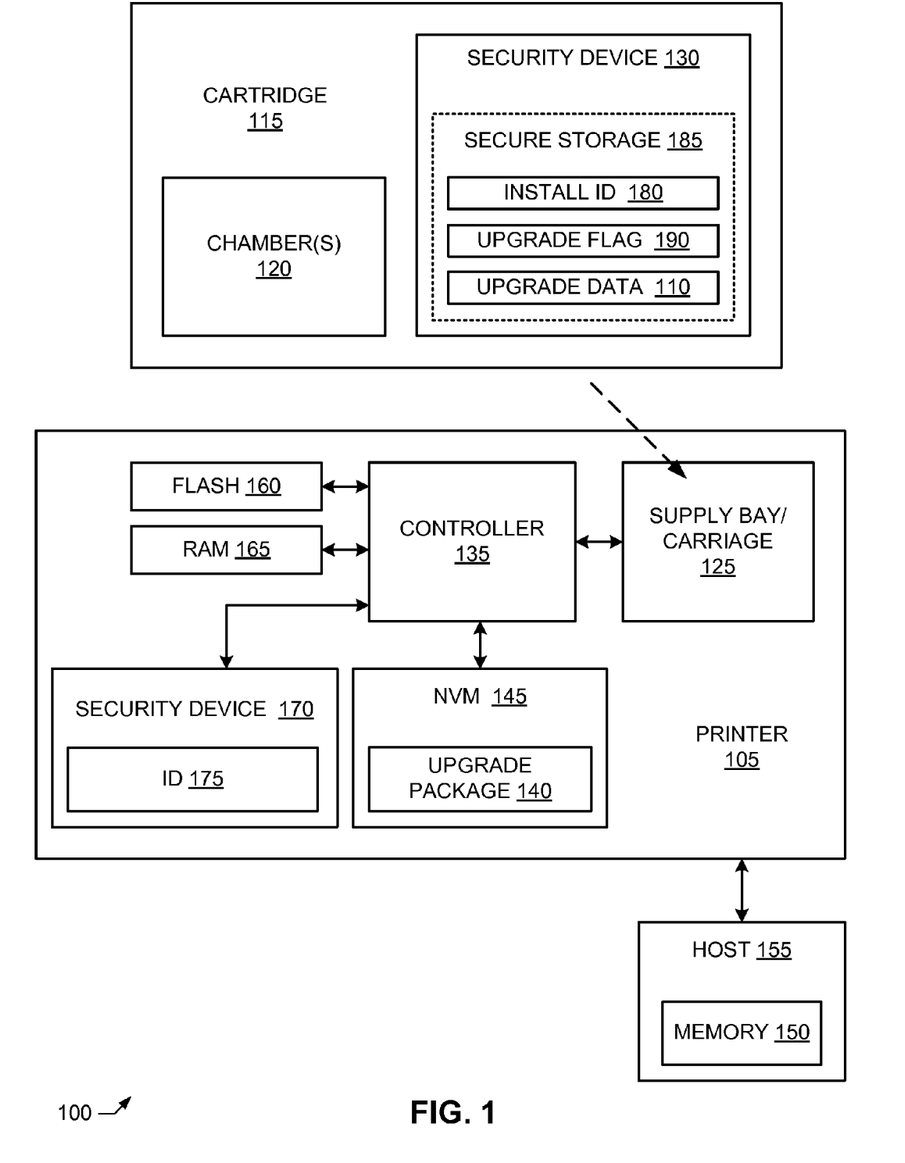
FIG. 1 is a schematic illustration of an example image forming apparatus that is structured in accordance with the teachings of this disclosure to be securely upgradeable from an inserted upgrade imaging supply.

FIG. 1 illustrates an example image forming apparatus 105 that is structured, configured, and/or programmed to be upgraded based on upgrade data 110 stored in, obtained from and/or provided by an upgrade imaging supply 115. The example image forming apparatus 105 of FIG. 1 may be a printer (e.g., an inkjet printer, a dye sublimation printer, a laser printer, a color laser printer, etc.) and/or any other additional and/or alternative device capable of forming an image on any type(s) of media (not shown). The example upgrade imaging supply 115 may be an ink cartridge, a toner cartridge having one or more tanks, containers and/or any other additional and/or alternative chambers 120 to store and supply one or more materials (e.g., an ink, a dye, a toner, etc.) useable by the example printer 105 and/or the upgrade imaging supply 115 to form an image on the media. As described below, the example upgrade imaging supply 115 of FIG. 1 is structured, configured and/or programmed to communicate with at least one component of the example image forming apparatus 105. For ease of discussion, the following descriptions will focus on an example in which the image forming apparatus 105 is implemented by a printer and the upgrade imaging supply 115 is implemented by an upgrade ink or toner cartridge. The example image forming apparatus 105 of FIG. 1 will hereafter be referred to as the printer 105, and the upgrade imaging supply 115 will hereafter be referred to as the upgrade cartridge 115.

The example upgrade cartridge 115 of FIG. 1 is insertable into a slot, carrier, receptacle, holder and/or supply bay 125 of the example printer 105. The example supply bay 125 of FIG. 1 includes any number and/or type(s) of connectors and/or conductors (not shown) that electrically and/or communicatively couple a security device 130 of the upgrade cartridge 115 to a controller 135 of the printer 105 via, for example, an inter-integrated circuit (I²C) interface.

While a single upgrade cartridge 115 and a single bay 125 are shown in FIG. 1, the example printer 105 may include more than one bay 125 to allow the printer 105 to form text and/or images on the media using more than one cartridge (e.g., the example upgrade cartridge 115 and a second cartridge). When more than one bay 125 is present, associated cartridges may operate simultaneously and/or sequentially. Further, when forming some example images on the media only a subset of the cartridges need be used. For example, a black and white image may be formed using only a black ink upgrade cartridge 115, leaving any color ink cartridges inactive. Further still, the example printer 105 may be operated with or without the upgrade cartridge 115 installed. For example, the upgrade cartridge 115 may be installed, used to upgrade the printer 105 and then replaced with another cartridge that is used for forming images on the media. Moreover, the upgrade cartridge 115 may not include the chamber(s) 120, ink, toner, etc. and, thus, not be useable to form images on the media.

To control operation of the example printer 105, the example printer 105 of FIG. 1 includes the example controller 135. The example controller 135 of FIG. 1 detects installed and/or inserted cartridge(s), and interacts with each inserted cartridge to determine whether the cartridge includes, contains and/or can provide upgrade data (e.g., the example upgrade data 110) and, thus, is an upgrade cartridge 115. When an upgrade cartridge 115 is detected, the example controller 135 establishes a secure communication session with the upgrade cartridge 115, obtains and/or receives the upgrade data 110 from the installed upgrade cartridge 115 as an upgrade package 140 via the established secure communication session, and securely and/or cryptographically stores the upgrade package 140 in a non-volatile memory 145. Additionally or alternatively, the upgrade package 140 may be stored in a memory 150 of a host computer 155 communicatively coupled to the printer 105.

Example interactions, processes and/or machine-accessible instructions that may be carried out by the example controller 135 and the security device 130 to upgrade the example printer 105 are described below in connection with FIGS. 3-8. The example controller 135 of FIG. 1 may also implement any number and/or type(s) of other functions and/or features related to other aspects of the example printer 105 such as, initialization, maintenance and/or configuration. Machine-accessible instructions representing the example processes of FIGS. 3-8 and/or other function(s) and/or feature(s) implemented by the example printer 105 may be stored in, for example, any number and/or type(s) of FLASH memory(-ies) and/or FLASH memory device(s) 160, and/or random-access memory (RAM) and/or RAM devices 165.

To enable secure communication with the example security device 130 and/or to enable authentication of the example upgrade package 140, the example printer 105 of FIG. 1 includes a security device 170. The example security device 170 may be any number and/or type(s) of security device(s), such as a smartcard IC, capable to authenticate the security device 130 and/or the upgrade cartridge 115 containing the security device 130 to the example printer 105. In the example of FIG. 1, the controller 135 together with the security device 170 implement and/or carry out any number and/or type(s) of security and/or authentication protocol(s) and/or message(s) with the security device 130 that allow the controller 135 to authenticate the identity of the security device 130 and/or the upgrade data 110, and/or for the controller 135 to authenticate the upgrade package 140 prior to the controller 135 applying the upgrade package 140. In the example of FIG. 1, the controller 135 together with the security device 170 implement an authentication protocol with the security device 130 based on a unique identifier 175 securely stored in the security device 170. While the illustrated example of FIG. 1 employs authentication and secure data storage to prevent unauthorized access to the upgrade data 110 and/or to ensure the upgrade package 140 has not been tampered with, the image forming apparatus 105 may be upgraded without authentication and/or secure data storage, obviating the need for the example security device 130 and the security device 170. While not shown in FIG. 1, in some examples the example security device 170 implements and/or includes the example non-volatile memory 145.

In some examples, after the upgrade cartridge 115 has been used to upgrade the printer 105, the example identifier 175 is written as an install ID 180 in a secure memory or storage area 185 of the security device 130. In other examples a portion of the identifier 175 or a modified version of the identifier 175 (e.g., a cryptographic hash) may be written as the install ID 180. In some examples, the install ID 180 and the complement of the install ID 180 are stored at two different byte-aligned memory locations within the memory area 185. If the upgrade cartridge 115 is authorized to upgrade more than one printer 105 (e.g., five), the memory area 185 stores the identifier 175 or a portion or derivative thereof of each upgraded printer 105 and a count (not shown) of the number of upgrades that have already been completed. The count may limit the number of times the upgrade cartridge 115 can be used for upgrades. Thus, when the count reaches a limit, the upgrade cartridge 115 may not be used to perform any additional upgrades. Additionally or alternatively, the count may be omitted and when each of a plurality of install IDs 180 have been written to the upgrade cartridge 115, the upgrade cartridge 115 may not be used to perform any additional upgrades. In some examples, the secure storage 185 includes an upgrade flag 190 to designate whether the upgrade cartridge 115 is an upgrade cartridge.

While the example upgrade cartridges 115 described herein include a single upgrade flag 190 and corresponding upgrade data 110, an upgrade cartridge 115 may contain any number of upgrade flags 190 corresponding to any number and/or type(s) of upgrade data 110 available via the upgrade cartridge 115.

While the example upgrade cartridge 115 of FIG. 1 includes the example security device 130 and the example upgrade data 110, another cartridge supported by the printer 105 need not include the security device 130 and/or the upgrade data 110. For example, only special-purpose upgrade cartridges 115 may include the example security device 130 and the example upgrade data 110. These special-purpose upgrade cartridges 115 could be sold (e.g., at a premium relative to cartridges that are not special purpose), provided free to high-volume and/or high-value customers, and/or provided free to all users to allow users to upgrade their printers 105. In some examples, upgrades occur without user knowledge and/or user interaction. In other examples, a user of the printer 105 needs to confirm, allow and/or acknowledge the upgrade(s) (e.g., using one or more buttons of the printer 105 and/or via a user interface implemented by the host 155 communicatively coupled to the printer 105) prior to the upgrade(s) being applied.

While an example printer 105 and an example upgrade cartridge 115 have been illustrated in FIG. 1 one or more of the interfaces, data structures, elements, processes and/or devices illustrated in FIG. 1 may be combined, divided, re-arranged, omitted, eliminated and/or implemented in any other way. Further, the example upgrade data 110, the example chamber(s) 120, the example supply bay 125, the example security device 130, the example controller 135, the example non-volatile memory 145, the example FLASH 160, the example RAM 165, the example security device 170, the example secure storage 185 and/or, more generally, the example printer 105 and the example upgrade cartridge 115 of FIG. 1 may be implemented by hardware, software, firmware and/or any combination of hardware, software and/or firmware. Thus, for example, any of the example upgrade data 110, the example chamber(s) 120, the example supply bay 125, the example security device 130, the example controller 135, the example non-volatile memory 145, the example FLASH 160, the example RAM 165, the example security device 170, the example secure storage 185 and/or, more generally, the example printer 105 and the example upgrade cartridge 115 may be implemented by the example process platform P100 of FIG. 8 and/or one or more circuit(s), programmable processor(s), application-specific integrated circuit(s) (ASIC(s)), programmable logic device(s) (PLD(s)), field-programmable logic device(s) (FPLD(s)), and/or field-programmable gate array(s) (FPGA(s)), etc. When any apparatus claim of this patent incorporating one or more of these elements is read to cover a purely software and/or firmware implementation, at least one of the example upgrade data 110, the example chamber(s) 120, the example supply bay 125, the example security device 130, the example controller 135, the example non-volatile memory 145, the example FLASH 160, the example RAM 165, the example security device 170, the example secure storage 185 and/or, more generally, the example printer 105 and the example upgrade cartridge 115 is hereby expressly defined to include a tangible article of manufacture such as a tangible computer-readable medium storing the firmware and/or software.

As used herein, the term "tangible computer-readable medium" is expressly defined to include any type of computer-readable medium and to expressly exclude propagating signals. As used herein, the term "non-transitory computer-readable medium" is expressly defined to include any type of computer-readable medium and to exclude propagating signals. Example tangible and/or non-transitory computer-readable medium include a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 8. Further still, the example printer 105 and/or the example upgrade cartridge 115 may include interfaces, data structures, elements, processes and/or devices instead of, or in addition to, those illustrated in FIG. 1 and/or may include more than one of any or all of the illustrated interfaces, data structures, elements, processes and/or devices.

FIGS. 2-7 illustrate example interactions and example processes that may be implemented using machine-accessible instructions, which may be carried out to upgrade the example printer 105. A processor, a controller and/or any other suitable processing device may be used, configured and/or programmed to execute and/or carry out the example interactions, the example processes and/or the example machine-accessible instructions of FIGS. 2-7. For example, the example interactions, the example processes and/or the example machine-accessible instructions of FIGS. 2-7 may be embodied in program code and/or instructions in the form of machine-readable instructions stored on a tangible computer-readable medium, and which can be accessed by a processor, a computer and/or other machine having a processor such as the example processor platform P100 of FIG. 8. Machine-readable instructions comprise, for example, instructions that cause a processor, a computer and/or a machine having a processor to perform one or more particular processes. Alternatively, some or all of the example interactions, the example processes and/or the example machine-accessible instructions of FIGS. 2-7 may be implemented using any combination(s) of ASIC(s), PLD(s), FPLD(s), FPGA(s), discrete logic, hardware, firmware, etc. Also, some or all of the example interactions, the example processes and/or the example machine-accessible instructions of FIGS. 2-7 may be implemented manually or as any combination of any of the foregoing techniques, for example, any combination of firmware, software, discrete logic and/or hardware. Further, many other methods of implementing the examples of FIGS. 2-7 may be employed. For example, the order of execution may be changed, and/or one or more of the blocks and/or interactions described may be changed, eliminated, sub-divided, or combined. Additionally, any or all of the example interactions, the example processes and/or the example machine-accessible instructions of FIGS. 2-7 may be carried out sequentially and/or carried out in parallel by, for example, separate processing threads, processors, devices, discrete logic, circuits, etc.

Figure 2:
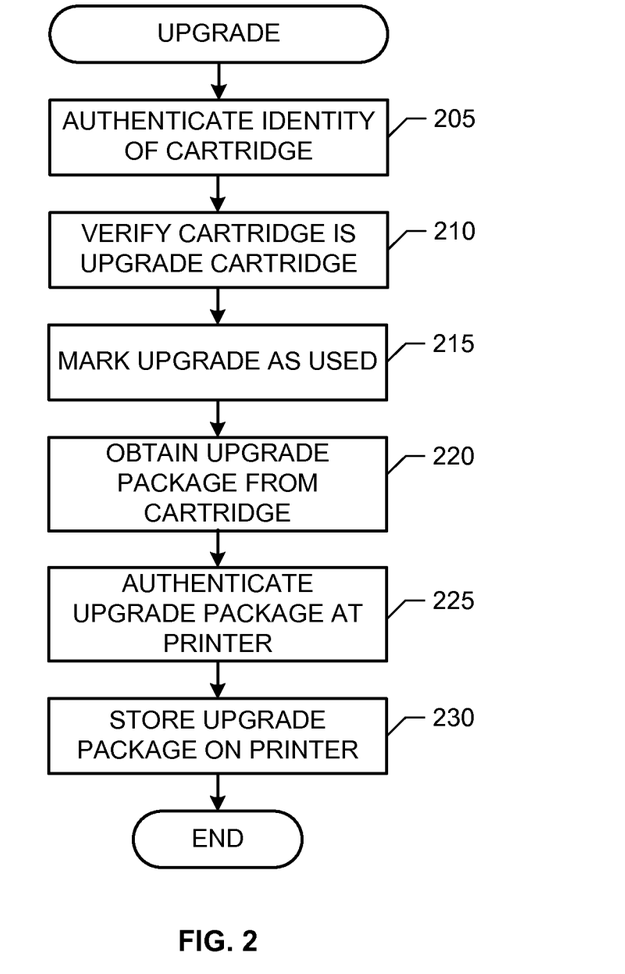
FIG. 2 illustrates an example upgrade process that may be implemented using machine-accessible instructions, which may be executed by, for example, one or more processors, to upgrade the example image forming apparatus of FIG. 1.

FIG. 2 illustrates an example process, which may be implemented as machine-accessible instructions executed by a processor, to upgrade the example printer 105 of FIG. 1. The example machine-accessible instructions of FIG. 2 begin when the example controller 135 of FIG. 1 detects that a cartridge (e.g., the example upgrade cartridge 115) has been installed and/or inserted into the example supply bay 125. The example controller 135 together with the example security device 170 interact with the example security device 130 of the installed cartridge 115 to authenticate the identity of the cartridge 115 by, for example, carrying out the example interactions and processes of FIG. 3 (block 205).

Figure 4:
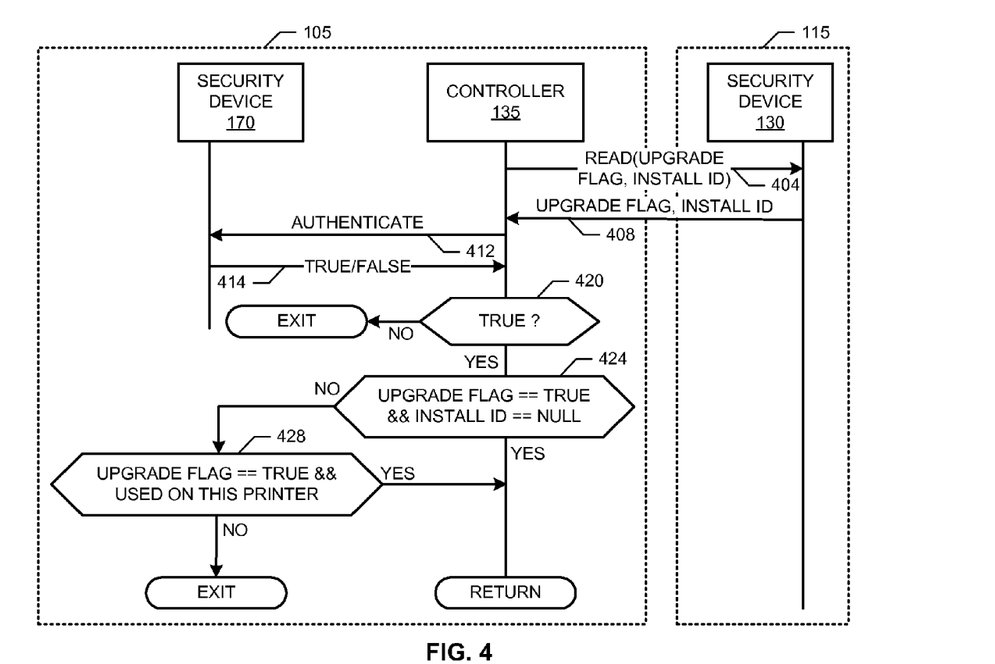

The example controller 135 verifies that the installed cartridge 115 is an upgrade cartridge and has an available upgrade by, for example, carrying out the example interactions and processes of FIG. 4 (block 210). Carrying out the example interactions and processes of FIG. 5, for example, the upgrade cartridge 115 is marked as having been used to upgrade the printer 105 (block 215).

Figure 6:
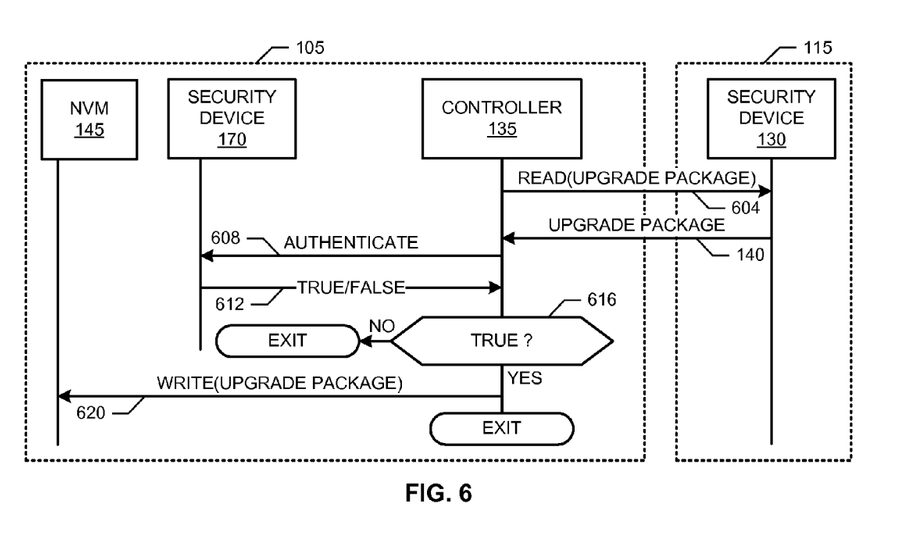

The example controller 135 obtains the example upgrade package 140 from the example upgrade cartridge 115 by, for example, carrying out the example interactions and processes of FIG. 6 (block 220). The example upgrade package 140 includes the example upgrade data 110 and one or more additional pieces of data and/or information that the controller 130 and the security device 170 can use to verify the authenticity of the upgrade package 140. Example additional data and/or information include, but are not limited to, a message authentication code, a secure signature and/or an encryption signature. The controller 135 together with the example security device 170 verify the authenticity of the upgrade package 140 (block 225) and stores the authenticated upgrade package 140 in the non-volatile memory 145 (block 230). In some examples, the upgrade package 140 together with other parameters and/or values that may be used to subsequently authenticate the contents of the upgrade package 140 are stored in the non-volatile memory 145. The authentication performed at block 225 in the example of FIG. 2 is conventional authentication performed in connection with secure transactions. In some examples, the upgrade package 140 may be stored in the non-volatile memory 145 without being authenticated at block 225. Example interactions and processes that may be carried out to implement the blocks 220, 225 and 230 are illustrated in FIG. 6. Control then exits from the example process of FIG. 2.

Figure 3:
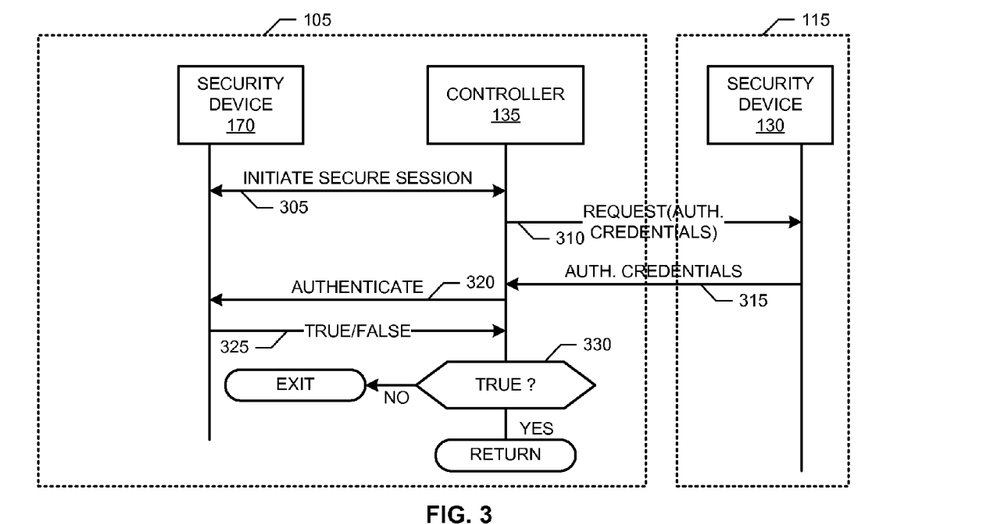
FIGS. 3, 4, 5 and 6 illustrate example interactions and example processes that may be implemented using machine-accessible instructions, which may be executed by, for example, one or more processors, to carry out the example upgrade process of FIG. 2.

FIG. 3 illustrates example interactions and processes, which may be implemented as machine-accessible instructions executed by a processor, to authenticate the identity of an installed cartridge. The example process of FIG. 3 may be carried out when, for example, the example controller 135 detects that the example cartridge 115 has be inserted and/or installed in the example bay 125. The example controller 135 and the example security device initiate 305 a secure communication session. The example controller 135 requests 310 authentication credentials from the example security device 130. In response to the request 310, the example security device 130 provides one or more authentication credentials 315 (e.g., a session key ID, a signature, a tamperproof ID, etc.).

Using the provided authentication credentials 315, the example controller 135 authenticates 320 the identity of the security device 130. The security device 170 provides an indication 325 to the controller 135 indicating whether the identity of the security device 130 was successfully authenticated. If the response 325 is TRUE (i.e., the identity of the security device 130 was authenticated) (block 330), the example process of FIG. 3 returns to, for example, block 210 of FIG. 2. If the response 325 is FALSE (block 330), the control exits from the example of FIG. 3 terminating, for example, the example process of FIG. 2. In some examples, the secure session and the authentication of the security device 130 are implemented in accordance with the advanced encryption standard (AES) as implemented by commercially available smartcard ICs.

FIG. 4 illustrates example interactions and processes, which may be implemented as machine-accessible instructions executed by a processor, to verify an installed cartridge is an upgrade cartridge. The illustrated example of FIG. 4 begins with the example controller 135 requesting 404 the example install ID 180 and the example upgrade flag 190 from the example security device 130. In response to the request, the security device 130 returns 408 the contents of the install ID 180 and the upgrade flag 190. In some examples, the install ID 180 contains a first value and a second value representing the complement of the first value, when the upgrade data 110 has been installed.

Based on the response 408 provided by the security device 130, the example controller 135 authenticates 412 the response 408 by, for example, verifying a signature included in the response 408. The security device 170 provides an indication 414 to the controller 135 indicating whether the response 408 was successfully authenticated. If the response 414 is FALSE (the response 408 was not authenticated) (block 420), control exits from the example of FIG. 4 terminating, for example, the example process of FIG. 2.

If the response 414 is TRUE (i.e., the response 408 was authenticated) (block 420), the example controller 135 determines whether the upgrade flag is set to TRUE representing the upgrade data 110 has not been installed and the install ID is set to a NULL value (block 424). If upgrade flag is set to TRUE and the install ID is set to a NULL value (block 424), control returns from the illustrated of FIG. 4 to, for example, block 215 of FIG. 2.

Otherwise, the controller 135 determines whether the upgrade flag is set to TRUE and the install ID indicates the upgrade cartridge 115 was previously used to upgrade the printer 105 (block 428). For example, a first value of the install ID may be compared to the example ID 175 and a second value of the install ID compared to the complement of the ID 175. If both comparisons are TRUE, then the upgrade cartridge 115 may be considered as having been previously used to upgrade the printer 105. If upgrade flag is set to TRUE and the install ID indicates the upgrade cartridge 115 was previously used to upgrade the printer 105 (block 428), control returns from the illustrated of FIG. 4 to, for example, block 215 of FIG. 2. Otherwise, control exits from the example of FIG. 4 terminating, for example, the example process of FIG. 2.

Figure 5:
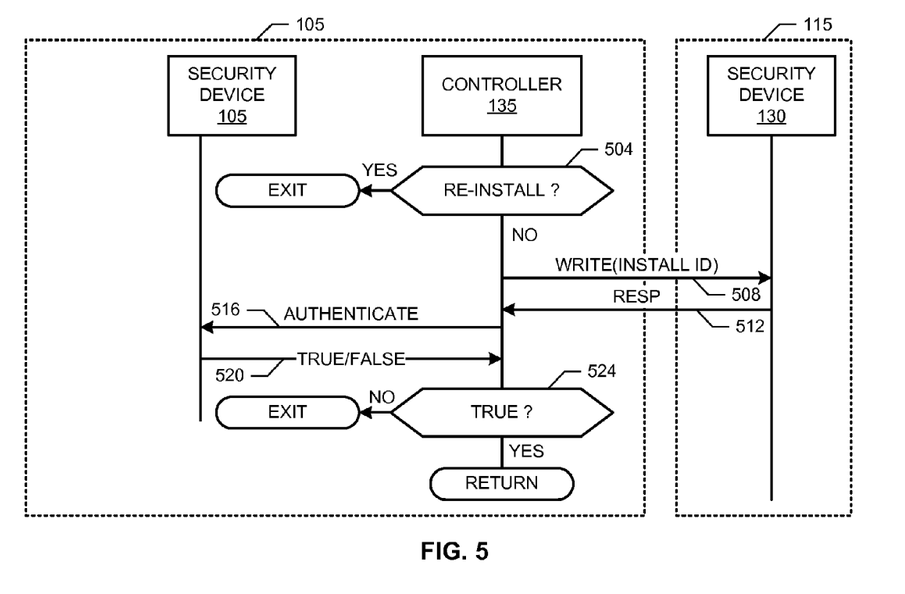

FIG. 5 illustrates example interactions and processes, which may be implemented as machine-accessible instructions executed by a processor, to mark an upgrade cartridge as having been used to upgrade a printer. The illustrated example of FIG. 5 begins with the example controller 135 determining whether the upgrade is being re-installed (block 504). For example, a first value of the install ID may be compared to the example ID 175 and a second value of the install ID compared to the complement of the ID 175. If both comparisons are TRUE, then the upgrade cartridge 115 may be considered as having been previously used to upgrade the printer 105. If the upgrade is being re-installed (block 504), control exits from the illustrated example of FIG. 5 terminating, for example, the example process of FIG. 2.

If the upgrade is not a re-install (block 504), the controller 135 sends a store or write command 508 to the security device instructing the controller 135 to set the install ID 180 to, for example, the ID 175. In some examples, a first value of the install ID 180 is set equal to the ID 175, and a second value of the install ID 180 is set equal to the complement of the ID 175. When the write is complete, the security device 130 provides a response 512 acknowledging the write was completed.

Based on the response 512 provided by the security device 130, the example controller 135 authenticates 516 the response 512 by, for example, verifying a signature included in the response 512. The security device 170 provides an indication 520 to the controller 135 indicating whether the response 512 was successfully authenticated. If the response 520 is FALSE (the response 512 was not authenticated) (block 524), control exits from the illustrated example of FIG. 5 terminating, for example, the example process of FIG. 2. If the response 520 is TRUE (block 524), control returns from the illustrated example of FIG. 5 to, for example, block 220 of FIG. 2.

FIG. 6 illustrates example interactions and processes, which may be implemented as machine-accessible instructions executed by a processor, to obtain an upgrade package from an upgrade cartridge and securely store the upgrade package on a printer. The illustrated example of FIG. 6 begins with the example controller 135 requesting 604 the upgrade package 140 from the security device 130. In response to the request 604, the security device 130 provides the upgrade package 140.

The example controller 135 authenticates 608 the upgrade package 140 by, for example, verifying a signature or message authentication code included in the package 140. The security device 170 provides an indication 612 to the controller 135 indicating whether the upgrade package 140 was successfully authenticated. If the response 612 is FALSE (the upgrade package 140 was not authenticated) (block 616), control exits from the illustrated example of FIG. 6 terminating, for example, the example process of FIG. 2.

If the response 612 is TRUE (block 616), the controller writes or stores 620 the upgrade package 140 together with any number and/or type(s) of other parameter(s) and/or value(s) that may be used to subsequently authenticate the contents of the upgrade package 140 in the non-volatile memory 145 and/or in the memory 150. Control exits from the illustrated example of FIG. 6, ending, for example, the example process of FIG. 2.

Figure 7:
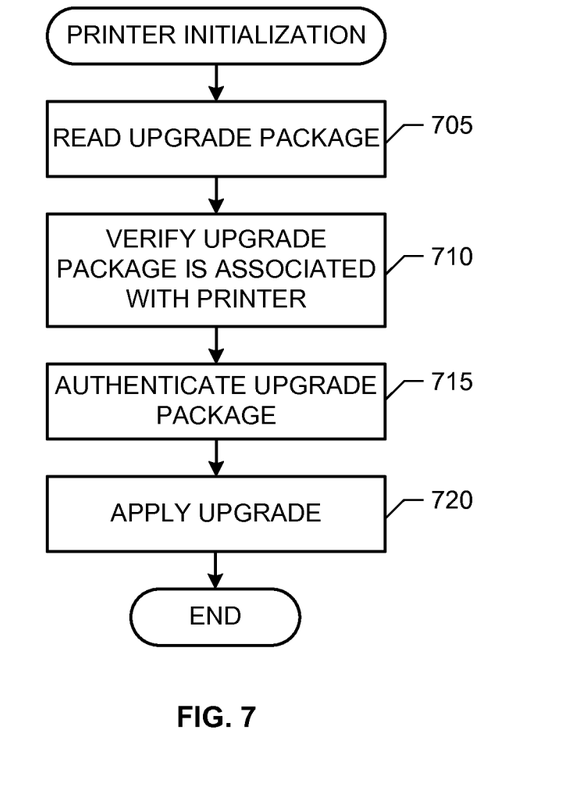
FIG. 7 illustrates an example process that may be implemented using machine-accessible instructions, which may be executed by, for example, one or more processors, to activate an upgrade during initialization of the example image forming apparatus of FIG. 1.

FIG. 7 illustrates an example process, which may be implemented as machine-accessible instructions executed by a processor, to apply an upgrade package obtained from an upgrade cartridge. The example process may be carried out, for example, each time the example printer 105 is initialized to re-apply and/or re-activate each upgrade every time the example printer 105 is initialized.

The example process of FIG. 7 begins with the example controller 135 reading the upgrade package 140 from the non-volatile memory 145 (block 705). The example controller 135 verifies that the upgrade package 140 is an upgrade package associated with the printer 105 by, for example, carrying out the example operations 424 and 428 of FIG. 4 (block 710). The example controller 135 verifies the authenticity of the upgrade package 140 by, for example, carrying out the example operations 608, 612 and 616 of FIG. 6 (block 715). In some examples, the operations of block 710 may be implemented as a part of the block 715.

The controller 135 applies the authenticated upgrade package 140 (block 720) by, for example, updating a table or other data structure that represents the features, functions and/or capabilities that are enabled, active and accessible. For example, the FLASH 160 may contain a default feature table that is loaded by the controller 135 into the RAM 165 during initialization. When the upgrade package 140 is applied, one or more entries of the feature table in the RAM 165 are updated to enable, activate and/or make accessible one or more additional features, functions and/or capabilities represented and/or identified in the upgrade package 140.

Figure 8:
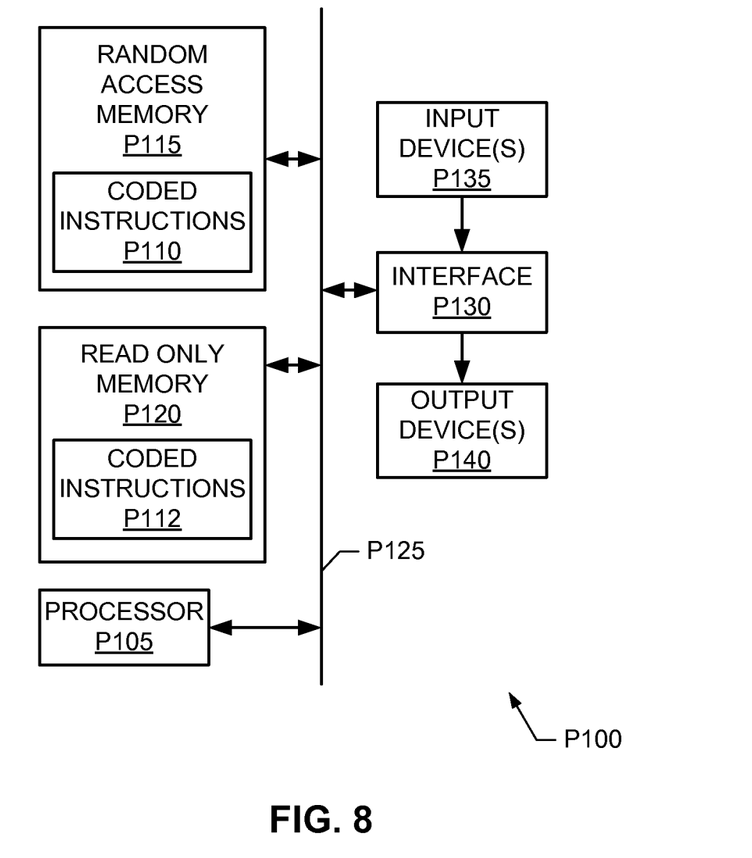
FIG. 8 is a schematic illustration of an example processor platform that may be used and/or programmed to execute the example interactions, the example processes and/or the example machine-accessible instructions of any or all of FIGS. 2-7 to upgrade the example image forming apparatus of FIG. 1.

FIG. 8 is a schematic diagram of an example processor platform P100 that may be used and/or programmed to execute the example interactions, the example processes and/or the example machine readable instructions represented by any or all of FIGS. 2-7. One or more general-purpose processors, processor cores, microcontrollers, etc may be used to implement the processor platform P100.

The processor platform P100 of the example of FIG. 8 includes at least one programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example machine-accessible instructions of FIGS. 3-6 to upgrade the example printer 105 of FIG. 1. Thus, the coded instructions P110, P112 may include the instructions of FIGS. 2-7.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device. The ROM P120 may be implemented by flash memory and/or any other desired type of memory device. Access to the memory P115 and the memory P120 may be controlled by a memory controller. The example memory P115 may be used to, for example, implement the example non-volatile memory 145.

The processor platform P100 also includes an interface circuit P130. Any type of interface standard, such as an external memory interface, serial port, general-purpose input/output, etc, may implement the interface circuit P130. One or more input devices P135 and one or more output devices P140 are connected to the interface circuit P130. The example input and output devices P135 and P140 may be used, for example, to implement an I²C interface.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent either literally or under the doctrine of equivalents.

What is claimed is:

1. An upgrade supply cartridge structured to be installed in an image forming apparatus, the upgrade supply cartridge comprising:
 a chamber to store a material useable by the imaging forming apparatus to form an image on media;
 a security device to provide an authentication credential to an image forming apparatus, the authentication credential useable to authenticate an identity of the upgrade supply cartridge; and
 a data storage including upgrade data useable by the image forming apparatus to activate a capability included but disabled in the image forming apparatus, the capability to remain activated at the image forming apparatus after the upgrade supply cartridge is removed from the image forming apparatus, the data storage structured to store an identifier of the image forming apparatus after the upgrade supply cartridge has been utilized by the image forming apparatus to activate the disabled capability.

2. The upgrade supply cartridge of claim 1, wherein the security device is structured to provide the authentication credential to the image forming apparatus to enable the image forming apparatus to establish an encrypted communication session with the upgrade supply cartridge.

3. The upgrade supply cartridge of claim 2, wherein the data storage is structured to receive the identifier of the image forming apparatus via the encrypted communication session.

4. The upgrade supply cartridge of claim 1, wherein the data storage is structured to store a flag indicating whether the upgrade supply cartridge has been previously utilized by the image forming apparatus.

5. The upgrade supply cartridge of claim 1, wherein the security device is structured to transmit the identifier of the image forming apparatus to the image forming apparatus in response to a request from the image forming apparatus.

6. The upgrade supply cartridge of claim 1, wherein the security device is structured to store the identifier of the image forming apparatus in the data storage prior to transmitting the upgrade data to the image forming apparatus.

7. The upgrade supply cartridge of claim 1, wherein the capability to be activated with the upgrade data stored in the data storage is a latent capability that is installed in the image forming apparatus during manufacturing of the image forming apparatus and is disabled by the manufacturer of the image forming apparatus.

8. A tangible computer-readable storage medium comprising instructions that, when executed, cause an upgrade supply to at least:
 provide an authentication credential to an image forming apparatus, the authentication credential useable to authenticate an identity of the upgrade supply;
 transmit upgrade data to the image forming apparatus, the upgrade data useable by the image forming apparatus to activate a capability included but disabled in the image forming apparatus, wherein the capability remains activated in the image forming apparatus after the upgrade supply is removed from the image forming apparatus; and
 store an identifier of the image forming apparatus in data storage after the upgrade supply has been utilized by the image forming apparatus to activate the disabled capability.

9. The tangible computer-readable storage medium of claim 8, wherein the instructions, when executed, cause the upgrade supply to provide the authentication credential to the image forming apparatus to enable the image forming apparatus to establish an encrypted communication session with the upgrade supply.

10. The tangible computer-readable storage medium of claim 9, wherein the instructions, when executed, cause the upgrade supply to receive the identifier of the image forming apparatus via the encrypted communication session.

11. The tangible computer-readable storage medium of claim 8, wherein the instructions, when executed, cause the upgrade supply to store a flag indicating whether the upgrade supply has been previously utilized by the image forming apparatus.

12. The tangible computer-readable storage medium of claim 8, wherein the instructions, when executed, cause the upgrade supply to transmit the identifier of the image forming apparatus to the image forming apparatus in response to a request from the image forming apparatus.

13. The tangible computer-readable storage medium of claim 8, wherein the instructions, when executed, cause the upgrade supply to store the identifier of the image forming apparatus in the data storage prior to transmitting the upgrade data to the image forming apparatus.

14. The tangible computer-readable storage medium of claim 8, wherein the capability to be activated with the upgrade data stored in the data storage is a latent capability that is installed in the image forming apparatus during manufacturing of the image forming apparatus and is disabled by the manufacturer of the image forming apparatus.

* * * * *